July 11, 1972   M. C. DEIBERT   3,676,222
CONDUCTIVE CARBON MEMBRANE ELECTRODE
Original Filed March 1, 1965   2 Sheets-Sheet 1

INVENTOR.
MAX C. DEIBERT
BY
L. Bruce Stevens, Jr.
ATTORNEY

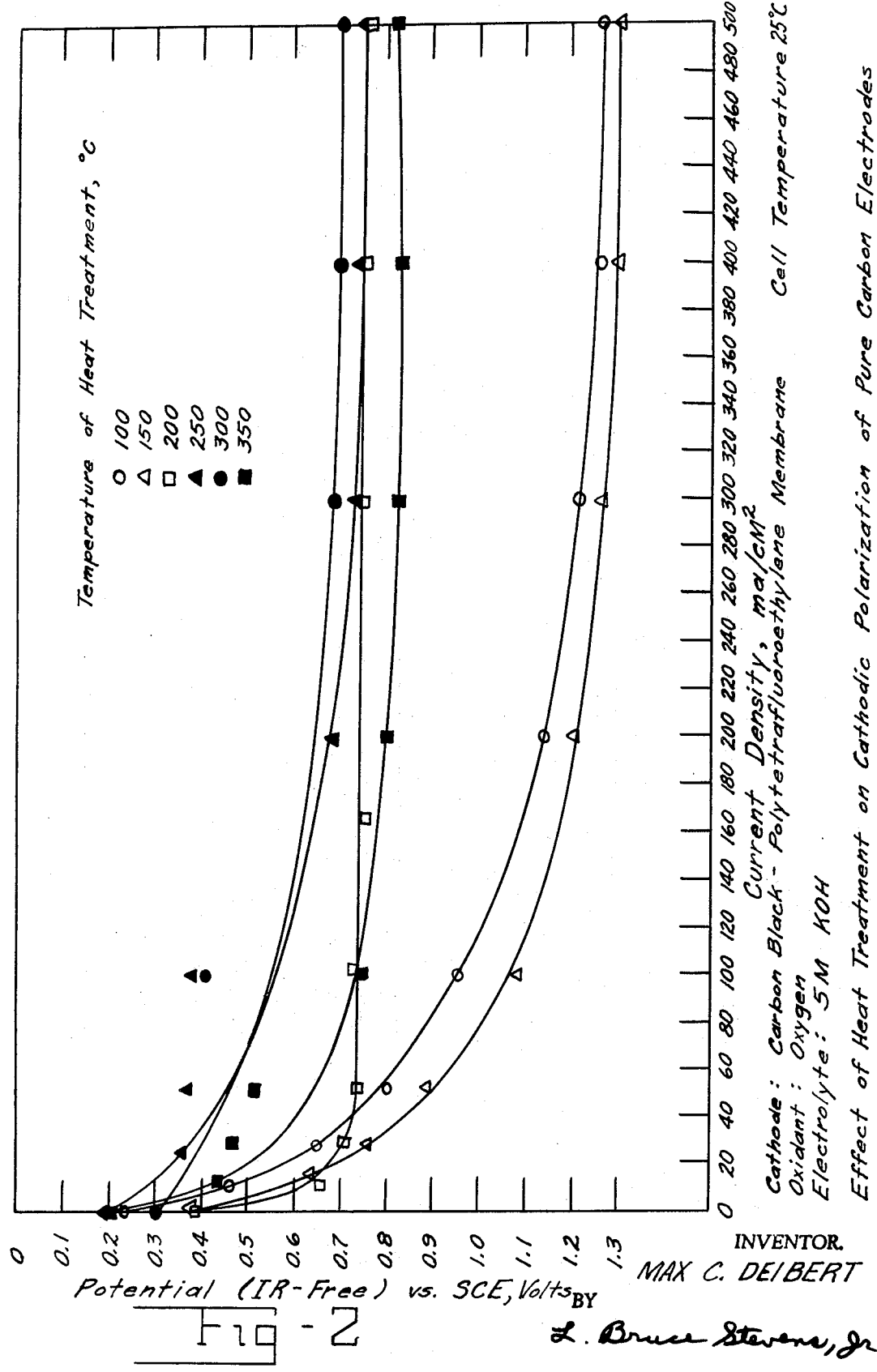

United States Patent Office 3,676,222
Patented July 11, 1972

3,676,222
CONDUCTIVE CARBON MEMBRANE ELECTRODE
Max C. Deibert, Needham Heights, Mass., assignor to Monsanto Research Corporation, St. Louis, Mo.
Continuation of application Ser. No. 656,611, May 24, 1967, which is a division of application Ser. No. 435,821, Mar. 1, 1965, now Patent No. 3,385,736, dated May 28, 1968. This application Sept. 10, 1970, Ser. No. 70,982
The portion of the term of the patent subsequent to May 28, 1985, has been disclaimed
Int. Cl. H01m 27/04, 13/02
U.S. Cl. 136—121   1 Claim

ABSTRACT OF THE DISCLOSURE

Novel membrane electrodes of particulate electrode material comprising conductive hydrophobic carbon and polytetrafluoroethylene with the electrode material particles coating the polytetrafluoroethylene particles, and substantially all of the surface of the electrode material being exposed.

---

This application is a continuation of application Ser. No. 656,611, filed May 24, 1967, now abandoned which is a division of application Ser. No. 435,821, filed Mar. 1, 1965, now U.S. Pat. 3,385,736.

This application relates to membrane electrodes, and more particularly, provides a novel method for making diffusion membrane electrodes and novel membrane electrodes produced by this method.

The present invention concerns a method of combining a particulate electrode material with a polymeric binder to provide diffusion electrodes for use in a cell. By an electrode material is meant an electrically conductive material, an electrochemical catalyst, or combinations of the same. By a diffusion electrode is meant a porous electrode permitting passage of the cell feedstock (a fuel or an oxidant) through the electrode to the electrode/electrolyte interface.

Particulate forms of electrode materials usually have especially high surface areas per unit weight. If these can be incorporated into an electrode without greatly decreasing the exposed surface area, they provide especially active electrodes. Mixing different electrode materials in particulate form provides intimate contact between the different materials. Some catalytic electrode materials are not conductive, and these must be intimately associated with a conductive electrode material to permit their utilization in an electrode. Other electrode materials, like platinum, are conductive but expensive, and the electrode cost can sometimes be decreased by their dilution, in intimate association, with cheaper electrode materials like carbon. A mere mixture of particulate materials generally has no mechanical strength, but a polymeric binder can be used to cohere the particulate materials into a solid, coherent electrode structure.

The particulate electrode material can be mixed with the polymeric binder in various ways. One approach consists of mixing dry particulate electrode material with dry particulate polymer, and fusing the mixture into a solid coherent structure. Heat and pressure may be used to produce such fusion. This method tends to involve high polymer loadings, and also has other deficiencies, as noted below. A second approach consists of precipitating the polymer onto electrode material particles, and fusing the particulate product by means as mentioned above. Both these procedures, which depend upon fusing an essentially dry particulate mass, tend to produce electrodes of low and erratic activity. This is possibly because the electrode material surface is partially covered by the polymer or buried in it, or perhaps because of inactivation of the electrode material by the temperatures or pressures of the molding processes.

The particulate electrode material can also be mixed with a liquid suspension of the polymeric binder, to form a loose slurry or paste. This permits thorough dispersion of small polymer particles among the electrode material particles, so that low polymer loadings can be used. Drying the paste or slurry by driving off the liquid leaves an open porous structure which is fragile, and must be handled carefully to avoid cracking it. At this stage, it is not suitable for use as a diffusion electrode. It is so open and porous that liquids can flow directly through it, so that it would operate effectively as an immersion electrode, rather than a diffusion electrode. Immersion electrodes permit uncontrolled access of the feedstock to the opposing electrode, which is generally undesirable. Application of pressure and heat can be used to compact this product into a more closely packed and stronger structure. However, this alters the initial porous structure, and accordingly, the electrode structure is developed during the pressing step. Thus, a balance must be maintained between application of sufficient pressure and heat to produce a strong ultimate structure, and avoidance of pressure and heat excessive enough to close up the pore structure to the extent that the resulting electrode is not porous enough for use as a diffusion electrode. To increase porosity, the mix may include materials which can be subsequently removed, such as a combustible organic material or a soluble inorganic material, subsequent combustion or leaching of which leaves porous spaces in the structure, when the porosity has been too greatly decreased during the pressing step. However, this adds still a further step to the process of developing a satisfactory porous electrode structure.

It is an object of this invention to provide a novel method of making diffusion electrodes and novel electrodes produced by such a method.

A particular object of this invention is to provide a novel method of making electrodes having a pore structure suitable for use as diffusion electrodes in which the pore structure is developed in a liquid-containing mixture during the process of mixing a polymeric binder with an electrode material.

These and other objects will become evident upon consideration of the following specification and claim.

In the description of the invention, reference is made to the accompanying drawings of which:

FIG. 2 is a graph of potential plotted against current drain illustrating the effect of heat treatment on the cathodic efficiency of electrodes made according to this invention;

Figure 1:
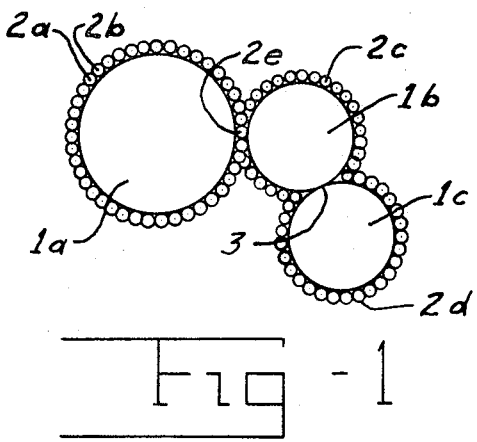
FIG. 1 is a schematic illustration of the postulated structure within diffusion membrane electrodes of this invention.

In accordance with the present invention, a homogeneous viscoelastic dough is formed by mixing a particulate electrode material with a polymeric binder and a liquid dispersion medium in proportions including about the maximum liquid:solids ratio producing a viscoelastic dough. Shear forces are applied to the viscoelastic dough in such mixing. The homogeneous dough is then spread into a thin membrane, of electrode thickness, while the liquid content of the dough is maintained substantially constant, and then the liquid component is evaporated off and the membrane is cured by heating, at atmospheric pressure or below. The stated procedure produces a surprisingly active, reproducible, flexible, non-friable, porous membrane electrode adapted for use as a diffusion electrode.

The presently provided membrane diffusion electrodes are useful for a wide variety of applications. They can be used as either the anode or the cathode of a cell, and may be used to advantage as the electrodes not only of fuel cells, for which they are particularly well adapted, but also in other electrochemical cells. Thus for example they may be used as electrodes, and particularly as air electrodes, in primary voltaic cells as exemplified by air cells, dry cells or the like, or in electrowinning apparatus, for purposes such as electrowinning oxygen from water, and so forth.

The presently provided procedure develops the electrode pore structure during mixing prior to the curing process, and these pores are freed of contained liquid as the membrane is cured by drying and heating. The membrane of the viscoelastic dough is itself strong and coherent, rather than being loose and fragile, and does not require pressing after being cured as stated to confer strength and coherence on it.

It will be evident that the present process differs from the above-discussed processes in which dry mixes of polymer particles and electrode material particles or polymer-coated electrode material particles are molded or fused together, in that the pore structure is developed during mixing of a liquid-containing combination of materials and controlled evolution of the liquid from the mix. With respect to the above-mentioned process using a loose dispersion, such as a slurry or a paste, the present process differs in that compression to confer strength on the structure after the liquid has been removed is not required. The present process wherein a viscoelastic dough is produced provides a strong, coherent structure prior to removal of the liquid, and the desired limited porosity in the ultimate electrode structure is essentially developed then. Of course, the pores have to be cleared of liquid, and some sintering, fusion, or other process whereby the binding strength of the polymer is enhanced may take place during the curing, but it is not necessary to change the electrode's pore structure by measures such as pressing to make it suitable for use as a diffusion electrode.

The product of the stated process is an electrode structure which not only is very strong and flexible, and has the limited porosity required for diffusion electrodes, but which furthermore exhibits a very high degree of activity of the electrode material used in its preparation. The electrode behaves as if the surface area of the particulate electrode material in it is almost entirely exposed, rather than being partially buried under the polymeric binder.

That there should be this high activity of the electrode material combined with strength and flexibility is surprising. The flexibility and strength are of the nature to be expected if the polymer were contacting all the electrode material particles, binding them together. However, the activity is of the kind to be expected if the active electrode material were entirely free of a coating of the polymer.

It is my theory that by the present procedure, I produce a continuous network of interconnected polymer particles coated with electrode materials. The observable properties are those of the electrode materials, as though the polymeric binder is coated with these materials, rather than the polymeric binder coating the electrode materials.

The amount of liquid in the dough is large enough so that the doughy mixture is sufficiently malleable to allow thorough mixing, yet small enough so that in the mixing there is a mechanical tendency to force the polymer particles together to form a network. Probably the electrode materials initially coat the polymer particles, which tends to diminish direct adherence of the polymer particles to one another. Then contacts between polymer particles are generated through abrasion of some electrode material at the points of contact between the coated polymer particles where the shear forces of the mixing process are highest. The contacts established by my procedure may be direct polymer/polymer contacts or may have a single particle of electrode material between the polymer particles. That polymer particle/electrode material particle contacts are strong and stable is evidenced by the fact that abrasion fails to separate electrode material particles from the surface of the cured membranes, although the surface of the membrane is substantially completely covered with electrode material. Thus the strength of the membrane is believed to depend on either direct polymer/polymer particle contacts or polymer/electrode material/polymer particle contacts. If there were two different electrode material particles coating two polymer particles at the point of contact between the two polymer particles, the strength of the membrane would depend on the strength of the electrode material particle contacts with each other, which is weak. Therefore two polymer particles must contact either the same electrode material particle or contact each other, to account for the observed strength of the membranes.

For an illustration of the foregoing, reference may be made to FIG. 1 which shows polymer particles 1a, 1b and 1c coated respectively with electrode material particles 2a, 2b, 2c and so forth. Electrode material particle 2e is in contact with both polymer particle 1a and polymer particle 1b, and serves to stick them together firmly. Polymer particle 1b and polymer particle 1c are in direct contact at contact point 3.

According to my theory, using a loose paste or slurry, rather than a dough, tends not to establish a continuous network of interconnected polymer particles, because the particles are kept separated by the liquid. Consequently such a paste, when dried, gives loosely structured membranes which are fragile and easily friable, and which must be compacted by compression to acquire toughness and strength, whereas my process avoids this necessity.

The unusual activity of my membrane electrodes, which are as active as if the electrode material were essentially totally exposed and yet as strong as if they included a continuous polymeric binder network, is possibly due also in part to the fact that the electrodes do not need to be exposed to sintering or molding conditions during their manufacture. In any case, their activity as catalytic electrodes is such that their performance outranks other electrodes, prepared from components as employed herein but by different procedures, to a significant degree. Furthermore, the present process is one which can be conducted quite readily and simply. The membranes produced from the homogeneous viscoelastic dough formed by thorough mixing of the particulate electrode material, polymeric binder and liquid dispersion medium are strong and flexible, and require no particular care in handling. On completion of the curing process, a product is obtained which is immediately useful, without further processing, to provide a membrane diffusion electrode in a cell.

As those skilled in the art will appreciate, by reference to direct utilization, it is not intended to exclude the employment of various additional steps, particularly those conventional in electrode preparation, such as association of the membrane with a screen support or current collector, as further discussed below. However, these are optional.

As will appear in more detail hereinafter, a variety of materials may be employed in preparing the present membrane electrodes. The type of polymeric binder and liquid dispersion medium particularly contemplated herein is an aqueous dispersion of polytetrafluoroethylene, and the following description of the technique of fabricating electrode membranes according to this invention will particularly refer to such aqueous dispersions. Various electrode materials may also be used, illustrative of which are carbon and platinum blacks. I have found that hydrophobic conductive carbon is especially valuable in this connection: the membranes made with it and polytetrafluoroethylene are hydrophobic and non-wetting.

Factors which I have discovered to be of significance in the fabrication of the present membrane electrodes are the ratio of polymer to electrode material, the particle size of these materials, the ratio of these solids to the aqueous phase of the mixture in the dough, and the procedure by which its aqueous content is removed from the dough to provide the final, cured membrane.

The ratio of the particulate electrode material to the polymer is adjusted to provide a continuous phase of polymer in the finished membrane electrode. By this I mean that, as discussed above, the contacts between polymer particles may be direct or may be accomplished by contact of two polymer particles with one and the same particle of electrode material, but in any case are such that an interconnected network of polymer particles is formed. Generally, the proportion of polymer to electrode material is desirably kept as low as possible, within this limitation, to maximize the exposure of the catalytic electrode material. At too high a ratio of polymer to electrode material, the activity of catalysts in the electrode is diminished and also, the electrode porosity decreases. However, with insufficient polymer, the membrane may lose solid particles when it is flexed or abraded after drying. I surmise that this may result because of failure to form an interconnected continuous network of polymer particles, as discussed above: extra electrode material particles are present which are not bonded to polymer. In general, the preferred weight ratio of polymer to particulate conductive material is in the range of from 5 to 1 to 1 to 20. Precise optimum ratios depend on the nature of the polymer and on factors such as the nature and particle size of the particulate electrode material. For polytetrafluoroethylene, which is the preferred polymeric binder for use in the present connection, the weight ratio of polymer to electrode material is generally in the range of 2 to 1 to 1 to 10, and usually in the range of from about 1 to 1 to 1 to 10.

The particle size of the electrode material should be low, suitably below about 1 micron. Particularly good results are obtained in the present method with electrode materials having an average particle size as low as about 0.05 micron and below. By this is meant the ultimate particle size: sometimes particulate materials are obtained initially in the form of aggregates, which break down into fine particles on exposure to shearing forces, such as those used in mixing in the present process. However, at least part of the electrode material may consist of larger size particles, particularly filamentary materials. For example, fibers may be included of a conductive material such as carbon, which are 0.35 to 0.45 mil in diameter and about 0.25 inch long. The dispersed polymer particles may for example have a size of about 0.2 micron. In general, the dispersed polymer particle size will be in the range of about 0.1 to 15 microns; a size in the range of 0.1 to 1.0 micron is generally preferred.

The ratio of the solids (polymer plus electrode material) to the aqueous phase of the mixture and the mixing will be such as to produce a viscoelastic dough, having a rubbery texture such that it can be stretched and elongated to a certain extent without breaking, but retaining its shape after deformation with sufficient force. The initial mixture may vary in consistency: my platinum/polytetrafluoroethylene dispersion mixes are initially pasty, while my carbon/polytetrafluoroethylene dispersion mixes are initially dry and powdery. However, on continued mixing, with the correct solids:water ratio, the mix will agglomerate and form a coherent lump of dough. The liquid content should be such that, after sufficient mixing, a dough is produced which is a viscoelastic material, mixing of which involves shearing forces, such that the particles are forced into contact with one another while being moved past each other.

Assuming sufficient mixing, the solids:water ratio determines the resulting structure. With a very high volume of liquid in proportion to solids, the mix is a paste. By a "paste" is meant a mixture of a consistency which will spread rapidly under gravitational forces, on surfaces like glass, whereas by a "dough" I mean a mixture which is self-supporting and tends to hold together in a solid mass, rather than wetting and spreading rapidly on surfaces under it. Drying and heating a paste produces a fragile structure with high pore volume. A mixture with a lower aqueous content holds together in a coherent mass that may be described as a dough, but which is not elastic or extensible, and which rather fragments when pulled. At a somewhat lower water content than this, the elastic and extensible viscoelastic type of dough which is contemplated in accordance with the present invention is formed.

If still less water is used to make the mix, the mix may agglomerate and form a rubbery dough which can be spread to a membrane. However, as a result of the low liquid content, after drying, this membrane has little or no porosity. The water content is therefore to be maximized as far as possible, while still producing a rubbery, elastic dough. Specific figures are dependent, as a rule, on the particular system in question. For example, in preparing a membrane with a platinum black, the weight ratio of the solids to the water content of the mix I use is approximately 1:1, whereas in preparing one with a carbon black, the preferred solids:water ratio is about 1:2. The volume ratio of solids to liquids, generally, runs about 1:1, however, in both these instances. In general, in any case, the amount of water to be employed may be described as the maximum which can be included while producing a dough of a viscoelastic consistency, and this can be determined experimentally.

The polymeric binder is preferably initially in aqueous dispersion. The polymer dispersion and any addiitonal water needed to adjust the water content to the useful liquids content in the ultimate mixture may be mixed with the particulate electrode material either separately or as a preformed diluted dispersion.

The mix should be made as homogeneous as possible. The mixing is to be continued not only until the mix has cohered into a viscoelastic dough, but subsequently, until this dough has become quite stiff. A correctly proportioned mix not mixed well enough will lack mechanical strength after curing, or indeed, may crack in curing. The mixing process is conducted under conditions in which shearing forces are applied. For large batches, suitable mixing equipment is exemplified by a Banbury mixer or a differential roller mill, as employed in rubber processing. In smaller batches, the mixing may be produced by procedures including stirring, grinding in a mortar with a pestle, rolling and folding, and the like, or combinations of such procedures. The rolling and folding technique consists of rolling out the dough into a membrane (a structure with a thickness which is small compared to its length and width) folding this back into a lump, and rolling this out again into a membrane, repeatedly.

During mixing, loss of fluid content can occur as a result of forcing out the liquid from the mass by application of excessive pressure in the mixing operation, or by evaporation. It is important that the mixture should lose as little as possible of its fluid content (or else be so proportioned that the water losses are designed to produce a dough of the ultimately desired solids/liquid proportions). Excessive loss of water adversely raises the viscosity of the material and decreases the pore volume of the final membrane. Thus, the time and severity of the mixing should be minimized, consistent with obtaining homogeneity of the product.

After complete mixing, the dough is shaped into a thin membrane. The present viscoelastic dough cannot simply be compressed under high pressure to flatten it: if this is done, excessive amounts of liquid are driven out from the dough, and driven out unevenly, leaving thin areas and breaks in the flattened product. However, I have found that I can spread a rubbery dough into a flattened thin membrane without substantial loss of liquid, by applying gentle pressure with means exerting both vertical and lateral spreading forces, such as by rolling out the dough. This gives a membrane of even thickness, which is free of breaks and which contains essentially all of the liquid content of the dough. The membrane is flexible and tough, and can be handled freely: it is self-supporting, for example.

To avoid having the membranes stick and tear as they are formed from the dough, it is usually desirable to protect the dough from direct contact with the compressing and spreading pressure-imposing surfaces, by interposition of a layer of a non-wetting surface. For example, the dough may be enclosed between sheets or films of a polymer such as polyethylene, polypropylene, polytetrafluoroethylene or the like while it is being spread by rolling.

The thickness of the membrane formed from the dough will be approximately that of the finished membrane electrode. The electrode will usually be below about 30 mils thick, and may be thinner, down to 3 to 5 mils or less. Usual means for controlling thickness of sheets formed by compression and spreading may be used, such as stops at the height of the desired thickness preventing further downward motion of the compressing and spreading agent.

In making electrodes by the stated novel process, the membranes prepared from the viscoelastic dough are usually pressed into a foraminous structure such as a screen prior to being cured. This provides mechanical support for the membranes; it may also decrease the internal resistance of a cell incorporating the electrode, and may serve as a current collector for the electrode. It is usually a screen, mesh or expanded metal sheet of conductive material, generally metal wires, which conducts electricity with less internal resistance than the electrode membrane with which it is placed in contact, and may be referred to as a screen support or screen current collector. The spaces between the meshes permit free passage of the fuel cell components such as feedstock, electrolyte, and so forth, so that they do not interfere with the functioning of the fuel cell. A mesh size of from 20 x 20 to 100 x 100 (openings/inch) made with 2–10 mil wire is usually satisfactory. The screen is advantageously applied to the membranes by laying the screen on the membrane and applying pressure, with a roller or the like, to force the membrane (which is still a flexible soft dough) into the meshes of the screen.

The membrane now, as such or in assembly with a screen, is ready to cure. The curing procedure involves drying and heating. By heating to cure the membrane is meant application of controlled elevated temperatures, above room temperature, to the membrane, to complete its drying and to produce mechanical strength by softening the polymer enough to stabilize the electrode structure. Part of the drying process may precede heating.

To avoid cracking, flaking and separation during the curing process, it has sometimes been found desirable to remove the majority of the liquid by drying through evaporation, without heating. The drying can be conducted by exposing the membrane to the air at a room (70° F.) temperature and in an atmosphere having a relative humidity somewhere below 100%, such as in the range of 30 to 75%. With the compositions of the present membranes, in which aqueous polytetrafluoroethylene dispersions are particularly contemplated, the membrane may develop cracks with too little drying before it is heated. The amount of care necessary in the drying depends somewhat on the dispersed particulate material in the electrode membranes. The membranes containing dispersed carbon black of fine particle size are particularly prone to crack if the heating is too rapid; with dispersed metallic catalysts, this is not such a problem. Room temperature drying may be omitted altogether in some cases, particularly where subsequent heating is gradual and slow; when it is used, typical room temperature drying times range from 1 to 12 hours.

The electrode is in any case heated to dry it completely by removing liquid components of the mix, and to stabilize the membrane structure. The heating preferably follows a gradual schedule, in which the temperature is raised by stages from room temperature to the ultimate heating temperature. This ultimate temperature will be high enough to remove substantially all the liquid content from the membrane, leaving a product consisting essentially of a porous membrane of electrode material and polymeric binder. For electrodes prepared from polytetrafluoroethylene, this ultimate temperature may be 300–325° C., for example. To cure the electrode membranes thoroughly, and make a durable product which does not tend to separate from the screen or flake off under subsequent mechanical stress, such as encountered in use in a cell, it is necessary to heat the membranes to this extent, it has been found. It will be noted that the stated temperature is below the sintering temperature of polytetrafluoroethylene, which is about 327° C. The membrances may be heated to a sintering temperature or above, but in fact the activity of an electrode which has been heated to substantially above the sintering temperature of polytetrafluoroethylene has been found inferior to that of one heated only to 300°: see FIG. 2, which is a graph illustrating variance of electrode activity with heating temperature for an electrode produced from conductive carbon and polytetrafluoroethylene binder, as described in Example 3, below.

As will be appreciated, if another polymer is used as the binder instead, the temperature will be appropriately adjusted to avoid melting or decomposing the polymer. In general, the dough will be heated to a temperature below the melting point of the polymeric component, but enough to cause it to soften. Heating above the temperature needed to drive off components of the membrane other than the polymer and electrode material appears to be desirable, to form a strong membrane. The higher temperatures can be regarded as having the effect of stabilizing the contact points of the polymer with the electrode material. However, having the polymer flow so that it may cover the electrode material is undesirable: it should just be softened.

Cure of the present membranes is conducted by drying and heating at or below ambient (atmospheric) pressure. It is characteristic of the present process that strong electrode structures which are impermeable to gross liquid flow, and which transmit liquids such as water at most through fine capillaries, if not only in the vapor phase, rather than as a freely flowing liquid stream, are formed during heating at atmospheric pressures or below. High pressures may be applied to the membranes subsequent to curing if desired, by cold-pressing to decrease the porosity still further, for example; but this is not needed to make the cured membranes impervious to gross liquid flow.

Application of moderate vacuum during the curing cycle is usually desirable. Besides helping to evaporate the water from the electrode membrane, it assists in removing any dispersing agent present. The initial polymeric binder dispersion may be the source of this dispersion agent. Heating will usually remove it, but an active catalyst electrode material like platinum black may cause such rapid decomposition of organic dispersing agents at elevated temperatures as to produce disintegration of the membrane. Application of vacuum in one of the initial heating stages of the curing cycle helps prevent this. Moderate vacuum such as pressures down to about 50–0.1 mm. Hg is usually sufficient.

When the cure is complete, the residual membrane electrode structure consists essentially of the polymeric binder and the dispersed electrode material; the liquid component of the original dough should have been substantially completely removed, along with any dispersing agent. As mentioned above, this membrane may be mounted on a screen. It may be used as is for an electrode, or further treated if desired. For example, if it is not hydrophobic, it may be desirable to waterproof it, for example by means known in the art such as application of a hydrophobic polymer such as polytetrafluoroethylene. If it is not catalytic for a particular electrochemical reaction, it may be coated with a catalyst, using electroplating or a like process, and so forth.

A variety of materials may be used in producing membrane electrodes according to the above-described procedure. The particulate electrode material must include an electrically conductive material and may include an electrochemical catalyst. These may be one and the same, or two different materials. If the catalyst is non-conductive, there must be enough conductive material present to make the finished membrane electrode conductive.

The conductive carbon contemplated as one of the particulate conductive electrode materials in accordance with this invention, may, for example, be an acetylene black, which has a small particle size and is conductive. Some other carbon blacks, such as certain furnace blacks, are also conductive and may be used. The carbon used may be either hydrophobic or hydrophilic, and porous or non-porous.

Contemplated electrode materials which are metallic may be conductive metals and/or anode or cathode catalysts. For catalysis of the cathode reaction, it is possible to use noble metals such as gold, silver, platinum, palladium, rhodium and the like (Group VIII in the Periodic Table, Periods 5 and 6) or metal oxides such as combinations of nickel oxide and lithium oxide. The anodic reaction in a fuel cell may be catalyzed by a metal of Groups I-B, V-B, VI-B and VIII of the Periodic Table such as chromium, tungsten, molybdenum, cobalt, nickel, gold, silver, copper, platinum, palladium, rhodium, iridium, other metals such as manganese and inorganic compounds containing one or more of such metals such as nickel oxide, manganese oxide, cobalt molybdate, vanadium pentoxide, and the like. Still other conductive materials and catalysts than those mentioned, metallic or not, may be used. Platinum is especially active as an anode catalyst, and is particularly preferred as the particulate conductive electrode material for many applications. As noted above, a fine particle size is desirable and a finely divided form of platinum known as platinum black is an especially preferred metallic electrode material in the present application.

As mentioned above, polytetrafluoroethylene is a particularly preferred polymer for use in practicing the method of the present invention. If desired, other polymers may be used instead.

Usually, to avoid electrode pore flooding, it is desirable to use a hydrophobic polymer, but hydrophilic polymers are sometimes useful: electrolyte can be introduced through the diffusion electrode with a feedstock, for example. Actually, the hydrophobic or hydrophilic character of the presently provided electrodes is controlled, it has been found, chiefly by the nature of the electrode material in it. Even when the polymer is hydrophobic, like polytetrafluoroethylene, an electrode material like Pt produces a moderately hydrophilic membrane, while an electrode material like a hydrophobic carbon black produces a membrane which is hydrophobic.

Broadly, presently suitable hydrophobic polymers include any polymer having a low free surface energy (which is characteristic of hydrophobicity), that will remain stable under fuel cell operating conditions (which may include heat, such as operating temperatures of 90° C. or higher, and contact with corrosive chemicals, such as acids, alkalies and oxidants). Such polymers include polymers of various halogen-substituted hydrocarbon monomers, particularly fluorine-substituted olefinic monomers. Halogen-containing polymers that may be employed include fluorocarbon polymers, substituted fluorocarbons wherein one or more fluorine atoms are replaced by hydrogen, chlorine or bromine, such as polytetrafluoroethylene, polytrifluoroethylene, polyvinyl chloride, polyvinylidene fluoride, polyvinyl fluoride, polytrifluorochloroethylene and copolymers of different fluorocarbon monomers such as copolymers of tetrafluoroethylene and hexafluoropropylene. Fluorocarbon polymers have been reported to be far superior to other polymers for improving electrode performance, particularly as to wetproofing electrodes.

Hydrocarbon polymers having a molecular weight in the range of 50,000 to 1,000,000 or more, having a free surface energy close to or below that of polyethylene, are also suitable for hydrophobic electrode membrane formation. Among these are polymers and copolymers of ethylene, propylene, 3-methyl-1-butene, 4-methyl-1-pentene and 4,4-dimethyl-1-pentene. Silicone polymers are also suitable as hydrophobic polymers. Example of other polymeric materials which may be mentioned as suitable in this connection include, for example, polyvinyl butyral, polystyrene-butadiene, polyamides of hexamethylene-diamine and adipic acid, polymethyl methacrylate, polyvinyl ethers (such as the methyl ether), polyvinyl acetate and its partially hydrolyzed derivatives, cellulose derivatives such as methyl cellulose ethers, polyvinyl alcohol, and so forth.

Water is a liquid dispersing medium which is a suitable and satisfactory liquid dispersion medium in the preparation of the present electrode membranes. Aqueous dispersions of polytetrafluoroethylene, for example, are readily available: see, thus, U.S. 2,478,229; British 642,045; U.S. 2,534,058; U.S. Pat. 2,662,065, and so forth. The dispersing agents present may be, for example, a surfactant such as lauryl sulfate, an alkaline metal or ammonium salt of an acid of formula $H(CF_2CF_2)_{3-10}COOH$, a saturated $C_{12}$ or higher hydrocarbon, a fluorine-containing compound such as 1,2-dichlorotetrafluoroethylene, and so forth. The wetting properties of such dispersions are sometimes improved by addition of a wetting agent, preferably of the nonionic type, such as a polyethylene p-octylphenol ether. Generally, methods are known for producing dispersions of other polymers in aqueous dispersion, also: for example, as taught in U.S. 2,559,752 for the production of chlorotrifluoroethylene polymer dispersions, these involve polymerizing the monomer in an aqueous medium. For the present purposes, I usually use a concentrated aqueous emulsion, having a composition of about 50:50 by weight water and polytetrafluoroethylene, to which has been added a small amount of some organic liquid such as toluene, and surfactants such as lauryl sulfate, an ether of a phenol with a polyethylene glycol, and the like (see U.S. Pat. 2,613,193). I either dilute this to the requisite concentration or add the necessary additional diluting water separately in mixing this with the particulate electrode material. However, a suitably less concentrated aqueous dispersion may of course be used.

The term, dispersion, is used herein to refer to combinations of a polymer and water which may be designated as emulsions, suspensions or dispersions: in any case, the polymer is combined with water so as to remain distributed in it, at least after stirring, for a period of time, rather than settling out immediately.

For use, the cured membrane electrode is mounted in a cell. For example, this may be a fuel cell. As those skilled in the art know, a fuel cell is a device for the generation of electrical energy in which a combustible fuel and an oxidant are supplied to a cell system including two electrodes separated by an electrolyte during operation of the cell. An individual fuel cell is ordinarily made up of a cell container, two conducting electrodes each including a catalyst for the desired electrochemical reaction, means for introducing an oxidant to the cathode and means for introducing a fuel to the anode, an electrolyte, and connecting means associated with each electrode (cathode and anode) for establishing electrical contact with an external circuit. Diffusion electrodes, as provided by this invention, may be positioned in the cell between the electrolyte and the means for introducing the oxidant and the fuel respectively to the two electrodes. Usually a battery of fuel cells, connected in series or parallel, is required for supplying the power needed to operate electrically-actuated equipment.

The nature of the fuel, oxidant and electrolyte may vary. Suitable fuel and oxidant feedstocks may include materials which are either liquid or gaseous at the operating temperatures for the cell. Examples of useful feedstocks are hydrogen, gases comprising hydrogen such as those produced by reforming hydrogen sources such as hydrocarbons, dimethyl hydrazine or the like, hydrazine, hydocarbons such a propane or methane, oxygenated hydrocarbons such as alcohols like methyl alcohol, ketones like acetone, aldehydes like formaldehyde, carboxylic acids like formic acid, and so forth. Examples of suitable oxidants include oxygen, gases comprising oxygen such as air, dinitrogen tetroxide, nitric acid, and so forth. Suitable electrolytes include acidic electrolytes such as aqueous solutions of $H_2SO_4$, $H_3PO_4$, HCl, $HNO_3$, perchloric acid and other strong acids, aqueous solutions of strong bases such as KOH, NaOH, LiOH and so forth, aqueous carbonate electrolytes such as $K_2CO_3$–$KHCO_3$, $NaCO_3$–$NaHCO_3$, molten salt electrolytes and so forth.

It will be appreciated that the presently provided novel electrode structure need not provide both the electrodes of a cell. If desired, one electrode may be of a structure known in the art, such as a porous diffusion electrode, as exemplified for example by a porous plaque prepared by sintering nickel powder particles and activated by deposition of an electrochemical catalysts such as platinum or palladium on the surface. The electrode may also be a solid sheet of platinum, operating as an immersion electrode, in a cell employing a feedstock which can be mixed with the electrolyte and selectively catalyzed for the electrochemical reaction. Accordingly, it is possible for one of the feedstocks of cells in accordance with this invention, if desired, to be a feedstock other than those mentioned: for example, it may be a metal consumable anode. However, inasmuch as this invention provides electrodes suitable for use both as cathodes and as anodes, advantageous results are obtained by making both the electrodes in accordance with this invention.

As illustrative of fuel cell construction, reference may be made to the figures.

Figure 3:
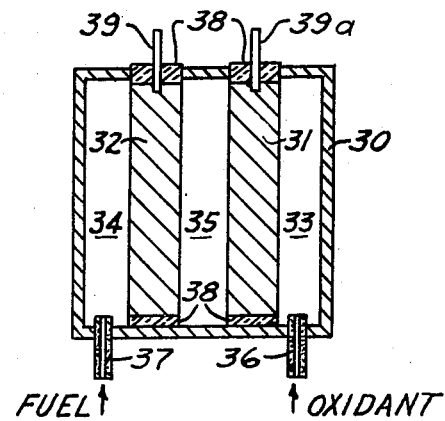
FIG. 3 is a cross-sectional diagrammatic illustration of a fuel cell employing diffusion electrodes.

FIG. 3 is a diagrammatic vertical section of a fuel cell wherein the conducting electrodes are plate-like structures which may be either flat, angular or curved in accordance with the desired embodiments of the basic design.

In FIG. 3 illustrating a cell employing plate-like electrodes, the space inside cell container 30 is divided by a porous cathode (oxidant electrode) 31 and a porous anode (fuel electrode) 32 into an oxidant receiving zone 33, a fuel receiving zone 34 and electrolyte compartment 35. Oxygen is introduced into oxidant receiving zone 33 via conduit 36. Fuel is introduced into fuel receiving zone 34 via conduit 37. Electrodes 31 and 32 are insulated from cell container 30 by conventional insulators 38. Connecting means 39 and 39a form the beginnings of an external circuit for withdrawing electrical power from the cell.

Figure 4:
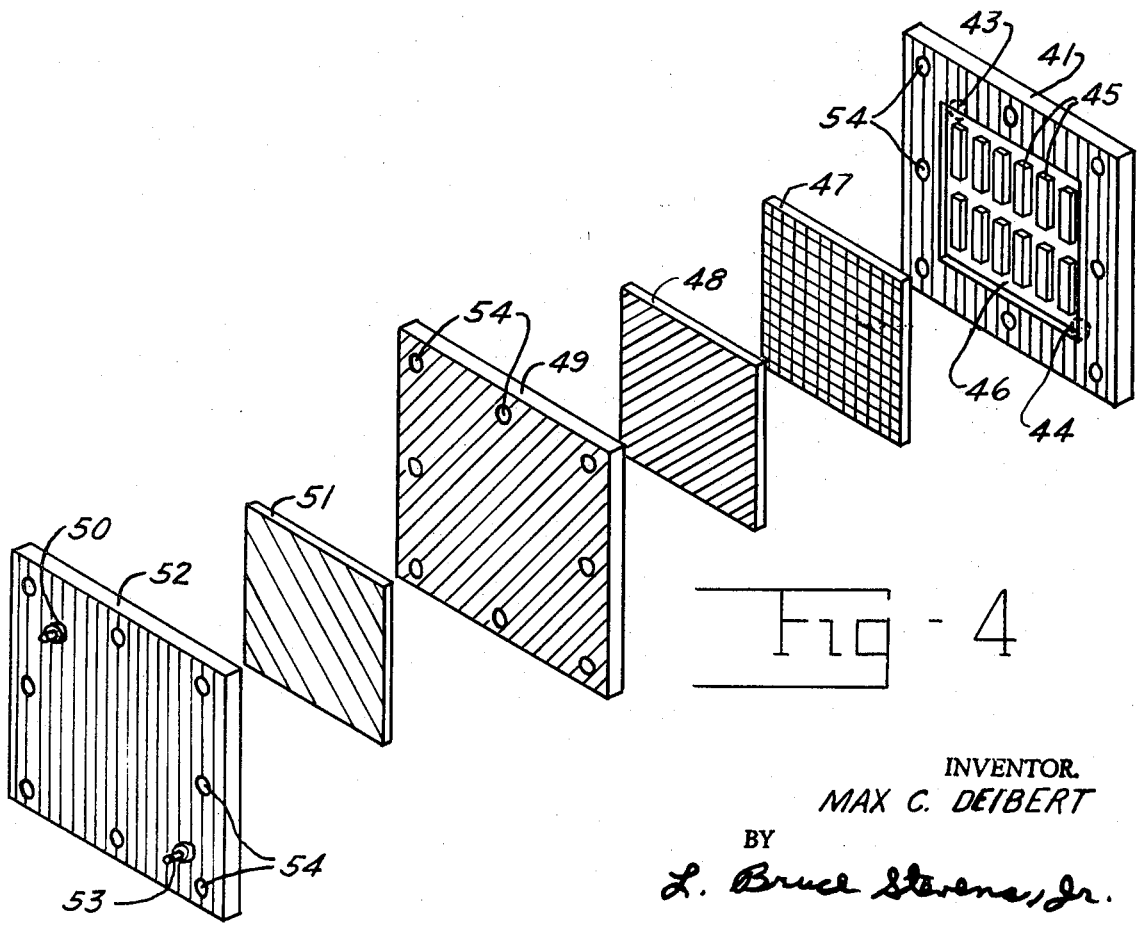
FIG. 4 is an exploded perspective view of the components of a fuel cell construction which may be employed in utilizing electrodes prepared in accordance with this invention.

FIG. 4 represents a somewhat similar type of cell, in an exploded perspective view. In FIG. 4, the cell end plate 41 contains an inlet port 43 and an outlet port 44 and supporting manifold brackets 45 in recess 46 for flow of a feedstock (such as oxygen) through recess 46. In the assembled cell, the feedstock will pass through screen current collector 47, which will be positioned against separating brackets 45, and through diffusion electrode (anode) 48 to reach an electrolyte contained in electrolyte holder 49, which may be, for example, an asbestos mat saturated with aqueous KOH as the contained electrolyte. Excess feedstock and vent gases from the electrolyte may exit by diffusion back through anode 48 and current collector 47 into recess 46 and exit through outlet port 44. A similar arrangement exists for inlet of a feedstock such as a fuel like hydrogen for example, through inlet port 50 in end plate 52, to diffuse through cathode 51 reaching contained electrolyte 49; any rejected vapors exit back through end plate 52 through outlet port 53. Bolt holes 54 are used for introduction of bolts (not shown) to hold the assembly together.

The electrodes of this invention may be embodied in a primary cell, for example, by placing a block of an anodic metal such as zinc and an electrode suitable for use as a cathode such as a carbon membrane electrode into contact with an electrolyte such as aqueous caustic, arranged so that the face of the cathode away from the electrolyte is exposed to air. Connection of the zinc anode and the membrane cathode to an external circuit will produce electrical power. Such cells may be stacked, with separators such as corrugated metal plates above each cathode to permit access of air to the cathode, and arrangements may be included to blow air through the cells or release oxygen into the cathode compartments. The electrodes of the invention may also be embodied in a cell to which power is supplied, rather than one supplying electrical power: for example, they may be embodied in a concentration cell for electrowinning oxygen, wherein the electrodes are each, for example, planar conductive membranes having an electrochemical catalyst such as platinum on the surface facing an electrolyte contained between them, which may be aqueous KOH, for example. The sides of the electrodes away from the electrolyte are exposed to differing concentrations of a cell feedstock such as oxygen, and the electrodes are connected to an external power source such as a dry cell, so that the direction of flow of electrons is towards the electrode exposed to the lower concentration of the oxygen. The source of the latter may be oxygen dissolved in water, for example, with a hydrophobic membrane electrode exposed thereto. This electrowinning cell will extract dissolved oxygen from water or extract oxygen from air and supply an oxygen-rich stream.

This invention is illustrated but not limited by the following examples.

EXAMPLE 1

This example illustrates preparation and operation of a cell in accordance with this invention.

An aqueous polytetrafluoroethylene ("Teflon" dispersion 852–201) emulsion is used in which the dispersed polymer particles are about 0.2 micron in diameter and which contains about a 50:50 weight ratio of the polymer to water. The emulsion also contains a minor amount (about 5% by weight of the total) of toluene and dispersion agents such as lauryl sulfate and a phenyl polyethylene glycol ether (about 2% of total).

Two parts of this 50:50 water-polytetrafluoroethylene emulsion are diluted with 9 parts of water. Nine parts by weight of platinum (Engelhard platinum black) are added to the diluted polymer dispersion and mixed in thoroughly until the mixture forms a coherent, homogeneous rubbery dough.

Two membranes are prepared from this dough as follows. A 4 gram portion of the mixed dough is laid between polyethylene sheeting, and a cylindrical hand roller is rolled along the top sheet to spread the dough into a membrane of even thickness, about 10–20 mils thick. A square of this membrane, about 3½ inches on a side, is pressed into a Monel screen current collector (60–80 mesh "wire-cloth") by rolling pressure. The stated procedure is repeated with another 4 gram portion of the mix to provide a second membrane mounted on a screen.

Both membranes are heated at 100° C. for ½ hour at atmospheric pressure, and then at 100° C. for ½ hour under vacuum. (The vacuum applied in heating as described in these and subsequent examples is a nominal 10 Torr.) The heated membranes are now stored in a humid atmosphere for about 60 hours, after which the membranes are again heated. The first membrane is heated to 100–125° C. at atmospheric pressure for ½ hour, then at 100° C. for ½ hour under vacuum. It is next heated at atmospheric pressure to about 200° C. for two hours and finally at about 300° C. for one hour. The second membrane is kept at 100° C. for 5 hours, at atmospheric pressure, then heated to 200° C. for one hour and finally to 300° C. for one hour.

The electrodes prepared as stated are employed in a fuel cell as electrodes as follows. They are placed with the screen side against an electrolyte of 40% KOH contained in an 0.03 inch thick asbestos mat. The anode side is backed by a separate current collector of 8–12 mesh stainless steel, 0.022 inch thick, and the assembly is placed between end plates, providing access for the gaseous feedstocks to the rear of the electrodes by grooving. The assembly is illustrated in FIG. 4. The exposed areas of the membrane electrodes are each respectively 0.04 square feet (sq. ft.). Hydrogen is supplied as the anode feedstock and oxygen as the cathode feedstock, at atmospheric pressure, and the cell is heated to about 100° C., while connections are made from the anode and cathode to an external circuit. The cell delivers from 175 to 200 watts per sq. ft. of electrode area at current densities ranging from 250 to 400 amperes per sq. ft. and potentials varying from 0.68 to 0.50 volt. The cell is operated for about 8 hours at a current output of 125 amperes per sq. ft. and a voltage of 0.80 volt.

EXAMPLE 2

This example illustrates preparation and characterization of electrochemical properties of a carbon membrane electrode of the invention.

Two parts of the 50:50 polytetrafluoroethylene aqueous dispersion described in Example 1 are diluted with 3.03 parts of water and then 1 part of Shawinigan carbon black (a conductive carbon black, particle size about 0.04 micron) is added to the diluted dispersion and mixed in. This again gives a solids:liquid volume ratio of 50:50 as in Example 1 where the electrode material was Pt, but whereas the weight ratio of platinum black to polytetrafluoroethylene in the preceding example is about 10:1, with this carbon black, the weight ratio is about 1:1.

The wet solid is placed on polyethylene sheeting on a flat surface, in a room having a humid atmosphere (above 50%). The dough is overlaid with a second sheet and a rolling pin is employed, with light pressure, to roll the mix into a thin sheet. The top sheet is then removed and the mixture lifted and folded into a lump which is again rolled out, between the polyethylene sheets, with light manual pressure. Mixing as stated and by spatula is repeated until the material is homogeneous and coherent. Extrusion of water from the dough during the mixing is slight. The mixed material is finally rolled between the polyethylene sheeting to spread the dough into a membrane of even thickness, about 10–20 mils thick, which is then pressed into a Monel screen current collector. It is then heated to 100° C. for an hour and finally heated to 300° C. for an hour.

The resulting cured carbon membrane is active as an oxygen electrode and does not wet even when used as an electrode. It is highly flexible and does not leak electrolyte. When the membrane, mounted against the screen current collector, is pressed into an annular nickel bracket with a circular exposed area 1.5 cm. in diameter, and tested for activity (measured against a calomel electrode), as an oxygen electrode in 40% KOH at 90° C., the open circuit potential is about 0.86 volt above the reversible hydrogen potential, and polarization from open circuit is about 0.14 volt at 500 milliamperes per square centimeter (ma./sq. cm.). The open circuit potential at room temperature is slightly higher than at 90°; the voltages obtained with current flow are about the same as those obtained at 90° C. (all voltages reported exclude internal resistance: "IR-free").

EXAMPLE 3

This example further illustrates preparation and utilization of carbon electrodes according to the invention, to provide the data graphed in FIG. 2.

A mixture of carbon black, polytetrafluoroethylene aqueous dispersion, and water in the weight ratio of 1:2:3 is prepared as described in Example 2 and after mixing, the dough is rolled out 8 times between polyethylene sheeting, finally being spread into a membrane 3–5 mils thick, which is air-dried for about a week.

The membrane is now heated, under vacuum, with circular samples about 1 sq. cm. diameter taken from it prior to each new heating, on the following schedule:

(1) 1 hour at 100° C.
(2) 1 hour at 150° C.
(3) 1 hour at 200° C.
(4) 1 hour at 250° C.
(5) 1 hour at 250° C. and 1 hour at 300° C.
(6) 1 hour at 350° C.

providing 6 heat-cured membranes, identified respectively as membranes (1) to (6). These are each mounted in an annular nickel holder, in which they are backed by a Monel screen current collector, and their (IR-free) potentials operating as an oxygen cathode in 5 molar KOH electrolyte are measured against a calomel electrode. It will be seen from FIG. 2 that, provided the electrodes are heated to at least about 200° C. prior to utilization, they will sustain a potential of about −0.7 volt at current drains as high as 500 ma./sq. cm.

EXAMPLE 4

This example illustrates utilization of a carbon membrane electrode of the invention as an anode.

A carbon-polytetrafluoroethylene membrane prepared as described in Example 2 is pressed into Monel screening while wet, cured by drying and heating, and electroplated with about 0.5 milligram of platinum per sq. cm. The resulting electrode is mounted in a nickel holder which leaves about 1 sq. cm. open area.

Tested as an anode with hydrogen as fuel in KOH at 90° C., the (IR-free) potential versus calomel electrode is −0.9 volt at 10 ma./sq. cm. As a cathode, with oxygen as the feedstock, the electrode potential in KOH at 10 ma./sq. cm. is −0.32, with or without the inclusion of internal resistance, and at 500 ma./sq. cm., the polarization (IR-free) is only 0.02 volt (both versus calomel electrode).

EXAMPLE 5

This example illustrates characterization of physical properties of membrane electrodes of the invention.

A mixture of Shawinigan carbon black, the aqueous dispersion of polytetrafluoroethylene, and diluent water in the proportions of 1:2:3 parts by weight is prepared as described above and mixed thoroughly. 1.43 grams of the mix is rolled out to a flat square membrane about 3.5 inches on a side. This is dried at room temperature, and the dried membrane is heated to 100° C. for one hour and then at 300° C. for one hour. The weight is measured before and after heating: water is 66% of the original weight, and the heating produces a weight loss of 62% of the original weight, indicating that part of the drying process has occurred prior to heating.

The density of the carbon membrane is about 0.56 g./cc. or about 1.70 cc./g. Since both carbon and polytetrafluoroethylene have a density of about 2 g./cc., this means that the volume percent of solids in the membranes is about 28%, and of voids, 72% (1.20 cc. void volume per g.). This corresponds to a loose-packed bed of spheres. Considering these spheres as carbon-coated polytetrafluoroethylene particles, if the carbon particle diameter is 0.04μ and the polytetrafluoroethylene particle diameter is 0.2μ, their total diameter is $$[0.2+2(0.04)] \approx 0.3\mu$$

The major pores in this structure (that is, the pores which are the spaces between the spheres) should then be about 0.3–0.5μ in size. Very fine pores would be present between the carbon particles on the polytetrafluoroethylene particle surfaces, additionally, and these fine pores would be spaces between close packed 0.04μ spheres or about 0.02μ in size (200 A.). Pore volume measurements using nitrogen sorption, capable of revealing pore sizes between about 16 A. and 450 A., indicates that about 0.19 cc. of pore volume per gram of these membranes is in pores smaller than 450 A., distributed as follows:

| Size range A.: | Percent of 0.19 cc./g. pore volume |
|---|---|
| 16–25 | 2.6 |
| 25–50 | 3.4 |
| 50–75 | 4.0 |
| 75–125 | 14.1 |
| 125–175 | 21.9 |
| 175–225 | 15.8 |
| 225–450 | 38.2 |
| Total | 100 |

These pores are of the sizes expected between the carbon particles and at points near the contact of the polymer particles. The remaining 1.00 cc. of void volume per gram of membrane is presumably present in the 0.3 to the 0.5μ size range.

Since the surface area of the carbon black is about 75 m.²/g., the surface area expected in the membrane is about 38 m.²/g. if negligible carbon surface area is covered by the polytetrafluoroethylene, the membranes being 50% by weight carbon and 50% polytetrafluoroethylene. Polytetrafluoroethylene does not absorb nitrogen in the region of temperature and pressure used for BET (Brunauer-Emmett-Teller) nitrogen absorption measurements. In BET tests, these membranes show surface areas ranging from about 40 m.²/g. sample, which is that predicted for total exposure of the carbon particles, to 23 m.²/g., which indicates that at least about ⅔ of the carbon surface area is exposed. Similar BET measurements for Pt-loaded membranes also indicate a surface area corresponding substantially to full exposure of the surface of the Pt black in a membrane prepared as described in Example 1.

EXAMPLE 6

This example illustrates operation of a cell with a different catalyst in an electrode prepared by the process of this invention.

Rhodium black is added to a diluted aqueous polytetrafluoroethylene dispersion, by the same procedure as described in Example 1 for preparation of the platinum electrode. The resulting membrane contains 10 milligrams per sq. cm. of rhodium. The membrane is pressed into a screen current collector and stored, exposed to the air, in a relatively dry room (relative humidity 25–75%) at room temperature for 12 hours. The membrane is now heated to 100° C. for one hour, under vacuum for about 10 minutes at the end of this time, heated at 200° C. for one hour and finally at 300° C. for one hour. The resulting electrode is mounted in a fuel cell as a cathode, with the screen side contacting an electrolyte which is an ion exchange membrane having a fluorocarbon base, of the graft polymer type (Permion 1010). The reverse side of the ion exchange membrane contacts an anode which is a plaque of a porous carbon, ¹⁄₁₆ inch thick (FC-13). The assembly is clamped between end plates including means for supplying anolyte and catholyte respectively to the anode and cathode. The anolyte pumped into the cell is 1 molar hydrazine in 5.76 molar (aqueous) phosphoric acid, and the catholyte is 5 molar nitric acid in 5.76 molar phosphoric acid. The electrodes are connected to an external circuit, and the performance at a cell temperature of 90° C. is measured. The exposed surface area of each of the electrodes is 9 sq. in. At a current drain of 0.5 ampere, the cell delivers 0.8 volt, and at a current drain of 1 ampere, the voltage is 0.6 volt.

Mixing of the rhodium black with the diluted polymer dispersion to form the initial rubbery dough is conducted by mixing the electrode material with the diluted dispersion until it coheres into a dough, and thereafter rolling out the dough between polyethylene sheeting, folding it into a lump and rolling out again, the procedure being repeated until a completely homogeneous mixture is produced. The same procedure can advantageously be employed to provide platinum-containing membranes.

While the invention has been described with particular reference to specific preferred embodiments thereof, it will be appreciated that modifications and variations can be made without departing from the scope of the invention as disclosed herein, which is limited only as indicated in the following claim.

What is claimed is:

1. A tough, flexible, porous, wet-proof membrane electrode which is a continuous network of interconnected polymer particles coated with electrode material consisting essentially of particulate electrode material comprising hydrophobic conductive carbon and polytetrafluoroethylene, wherein said electrode material particles coat said polytetrafluoroethylene particles and substantially all the surface of the electrode material is exposed, said membrane electrode having been made by forming a homogeneous viscoelastic dough by mixing hydrophobic conductive carbon with an aqueous dispersion of polytetrafluoroethylene in proportions including about the maximum water:solids ratio producing a viscoelastic dough, spreading said dough to a membrane of electrode thickness without substantially changing the water content of the dough, and heating the membrane at a temperature above about 200° C. up to about 325° C.

References Cited

UNITED STATES PATENTS

| 3,252,839 | 5/1966 | Langer et al. | 136—86 D |
| 3,385,736 | 5/1968 | Diebert | 136—120 |

FOREIGN PATENTS

| 931,732 | 7/1963 | Great Britain | 136—86 D |

ALLEN B. CURTIS, Primary Examiner